United States Patent
Loh et al.

(10) Patent No.: US 10,781,671 B2
(45) Date of Patent: Sep. 22, 2020

(54) METHODS AND APPARATUSES FOR CONTROLLING FINES MIGRATION IN A WELLBORE

(71) Applicants: Yuh Loh, Cypress, TX (US); Zhi Yong He, Cypress, TX (US)

(72) Inventors: Yuh Loh, Cypress, TX (US); Zhi Yong He, Cypress, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 83 days.

(21) Appl. No.: 16/131,600

(22) Filed: Sep. 14, 2018

(65) Prior Publication Data

US 2020/0088012 A1    Mar. 19, 2020

(51) Int. Cl.
| | | |
|---|---|---|
| *E21B 43/02* | (2006.01) | |
| *E21B 33/138* | (2006.01) | |
| *C09K 8/504* | (2006.01) | |
| *C09K 8/516* | (2006.01) | |

(52) U.S. Cl.
CPC .............. *E21B 43/02* (2013.01); *C09K 8/504* (2013.01); *C09K 8/516* (2013.01); *E21B 33/138* (2013.01)

(58) Field of Classification Search
CPC ....... E21B 43/02; E21B 33/138; C09K 8/504; C09K 8/516
See application file for complete search history.

(56) References Cited

U.S. PATENT DOCUMENTS

| | | | |
|---|---|---|---|
| 8,528,633 B2 | 9/2013 | Agrawal et al. | |
| 9,101,978 B2 | 8/2015 | Xu et al. | |
| 2009/0255686 A1* | 10/2009 | Richard | .................. E21B 37/06 166/376 |
| 2015/0267501 A1* | 9/2015 | Al-Gouhi | ............ E21B 33/1272 166/299 |
| 2016/0177661 A1* | 6/2016 | Xu | .......................... E21B 33/13 166/292 |

* cited by examiner

*Primary Examiner* — Brad Harcourt
(74) *Attorney, Agent, or Firm* — Cantor Colburn LLP

(57) ABSTRACT

A method of controlling fines migration in a wellbore penetrating a subterranean formation, the method comprising: introducing into the wellbore a screen mesh in an unexpanded form disposed of a first tubular member having a body with apertures, the screen mesh comprising a degradable material; expanding the screen mesh; injecting a cement slurry into the wellbore to fill open spaces within the expanded screen mesh; allowing the cement slurry to set forming a set cement that reduces or substantially preventing the passage of formation particles from migrating from the subterranean formation into the wellbore; and removing the degradable material of the screen mesh forming a fluid pathway in the set cement, which allows a formation fluid to flow from the subterranean formation into the wellbore.

18 Claims, 11 Drawing Sheets

METHODS AND APPARATUSES FOR CONTROLLING FINES MIGRATION IN A WELLBORE

BACKGROUND

The disclosure is directed to apparatuses and methods of treating subterranean formations. More specifically, the disclosure relates to apparatuses and methods of controlling fines migration in a well.

During well stimulation, completion, and production operations, clays, sand, micas, feldspars, plagioclase, or other fine particles may be generated. Fines may result from an unconsolidated or inherently unstable formation, or from the use of an incompatible treatment fluid that liberates fine particles. Other sources of fines include particulates added to the wellbore such as fines present in a proppant or produced from partially crushed proppant.

Once generated, formation fines may migrate toward the near wellbore area due to drag or other forces. The migrated fines can plug, erode or cause significant wear of downhole equipment and surface facilities. The fines can also plug or clog flow channels in the formation, thereby significantly reducing well productivity. Typically, sand control is achieved either by injecting resins downhole to consolidate a formation or by placing gravel packs which allow hydrocarbon to flow but prevent solid particles from entering a production well. While the resin method can have limitations associated with the depth of a treatment and an induced formation damage, the gravel pack method can be costly. Thus it would be desirable to provide an alternative method to reduce or substantially present formation fines migration.

SUMMARY

A method of controlling fines migration in a wellbore penetrating a subterranean formation comprises introducing into the wellbore a screen mesh in an unexpanded form disposed of a first tubular member having a body with apertures, the screen mesh comprising a degradable material; expanding the screen mesh; injecting a cement slurry into the wellbore to fill open spaces within the expanded screen mesh; allowing the cement slurry to set forming a set cement that reduces or substantially preventing the passage of formation particles from migrating from the subterranean formation into the wellbore; and removing the degradable material of the screen mesh forming a fluid pathway in the set cement, which allows a formation fluid to flow from the subterranean formation into the wellbore.

An assembly for controlling fines migration in a wellbore penetrating a subterranean formation comprises a first tubular member having a body with apertures; a screen mesh disposed of the first tubular member, the screen mesh comprising a degradable material; a second tubular member coupled to the first tubular member in such a way that allows for a relative longitudinal motion between the first tubular member and the second tubular member; and a deployment mechanism configured to expand the screen mesh once the screen mesh is placed in the wellbore next to a zone of interest.

BRIEF DESCRIPTION OF THE DRAWINGS

The following descriptions should not be considered limiting in any way. With reference to the accompanying drawings, like elements are numbered alike.

DETAILED DESCRIPTION

Disclosed are methods and apparatuses for controlling fines migration in a wellbore using an expandable screen mesh comprising a degradable material.

Figure 1:
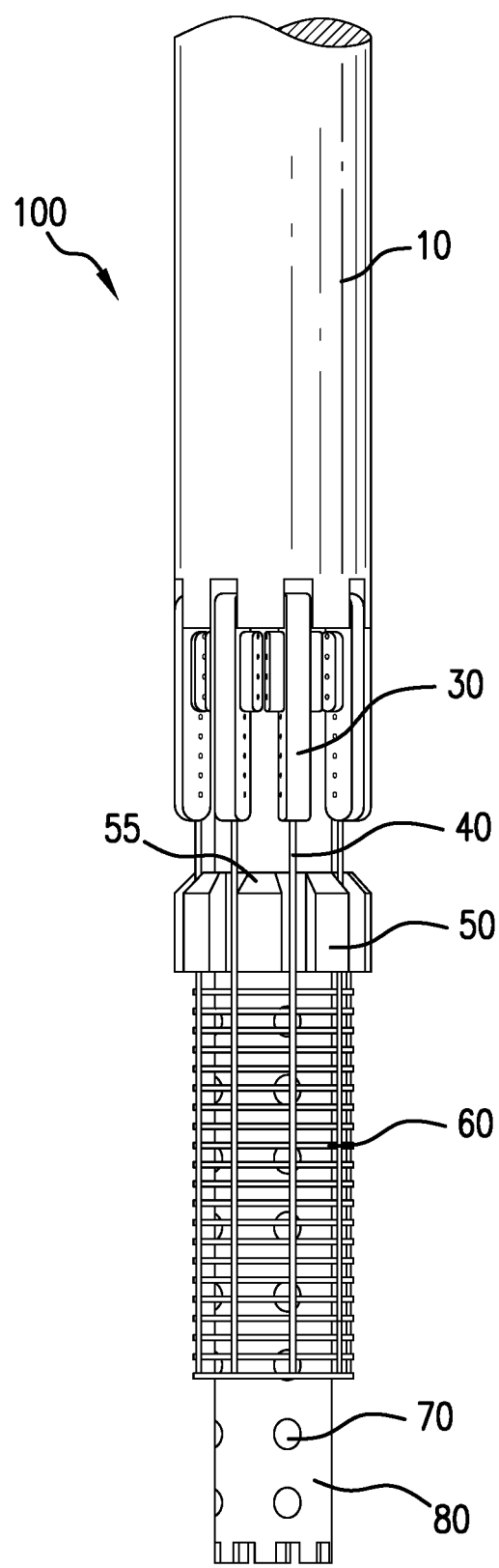
FIG. 1 illustrates a fines control assembly according to an embodiment of the disclosure.
Figure 2:
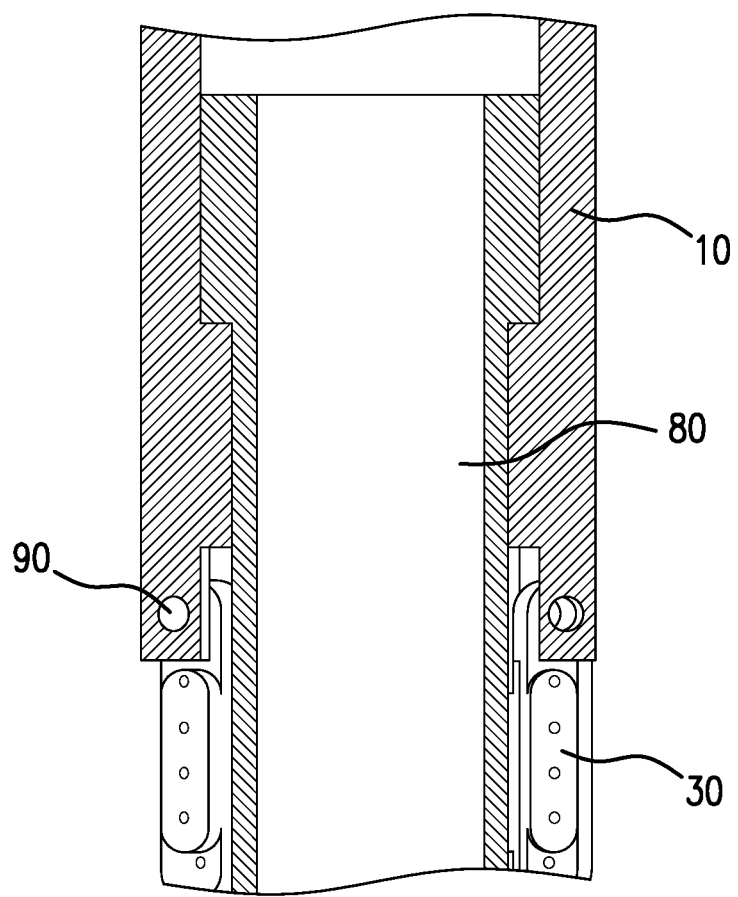
FIG. 2 shows the details of the connection between the arm and a second tubular member in a formation fine control assembly.

Referring to FIG. 1, a fines control assembly 100 includes a first tubular member 80 having a body with apertures 70, and a second tubular member 10 coupled to the first tubular member 80. In particular, the first and second tubular members are coupled in such a way that the first tubular member 80 can move relative to the second tubular member 10 along a longitudinal direction. For example, the first tubular member 80 can hang freely on the second tubular member 10.

Assembly 100 also includes a screen mesh 60 disposed of the first tubular member 80. The screen mesh 60 comprises a degradable material, which includes polymers, metals, inorganic compounds, and the like. The degradable material can be coated or molded on the screen mesh. For example, the degradable material can be coated or molded on metal wires that form the screen mesh. Alternatively or in addition, the screen mesh can comprise wires that are formed of a degradable material.

Figure 3:
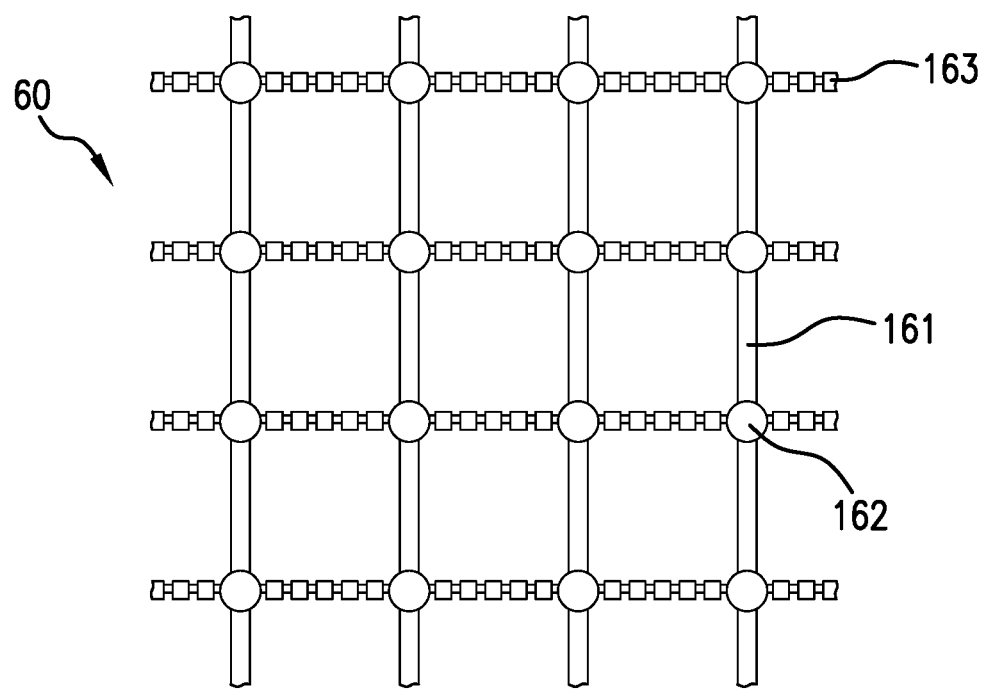
FIG. 3 is a cross-sectional view of a screen mesh.

An example of the screen mesh 60 is shown in FIG. 3. The screen mesh 60 has a three dimensional structure. As shown in FIG. 3, the screen mesh 60 has a first set of wires 161 and a second set of wires 163 connected to the first sets of wires 161 at connection points 162. The first set of wires 161 can be the same or different from the second set of wires 163. In an embodiment, the first set of wires 161 have solid connections or rigid connections to provide strength to the screen mesh while the second set of wires 163 include flexible connections to allow the screen mesh 60 to be deployed from an unexpanded form to an expanded form.

Figure 4:
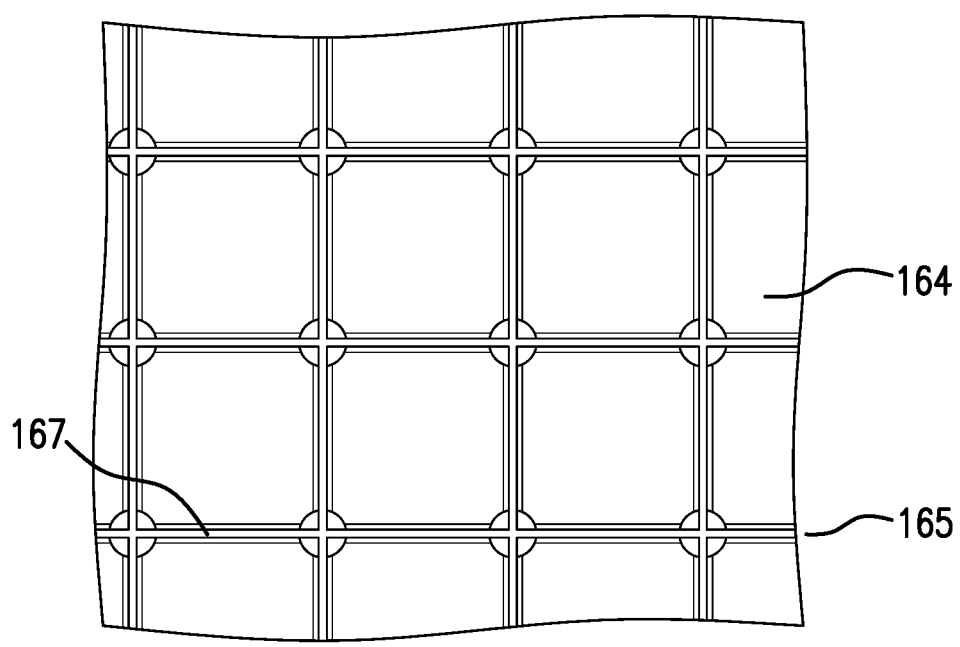
FIG. 4 illustrates the manufacturing of a screen mesh.

One method of coating or molding the screen mesh is illustrated in FIG. 4. The method includes placing wires such as metal wires 165 on a molding fixture 164, injecting a degradable material 167 to fill the cavities insider the molding fixture, and molding and curing the degradable material if needed to form the coated wires. The coated or molded wires can be connected forming screen mesh 60. To make wires formed of a degradable material, a degradable material can be injected to an empty molding fixture to fill the cavities insider the molding fixture, and molding and curing the degradable material if needed to form the degradable wires.

Assembly 100 also includes a deployment mechanism configured to expand the screen mesh once the screen mesh is placed in the wellbore close to a zone of interest such as a production zone. The deployment mechanism comprises a controller 50 mounted on the first tubular member 80; and at least an arm 30 secured to the second tubular member 10 via a pivoting point 90. The arm 30 has a plurality of ribs 40 connected to the screen mesh 60. The controller 50 has a tapered surface 55 configured to engage arm 30 to cause the arm 30 to pivot and extend outwardly from the second tubular member 10 during the deployment of the screen mesh 60.

Figure 5:
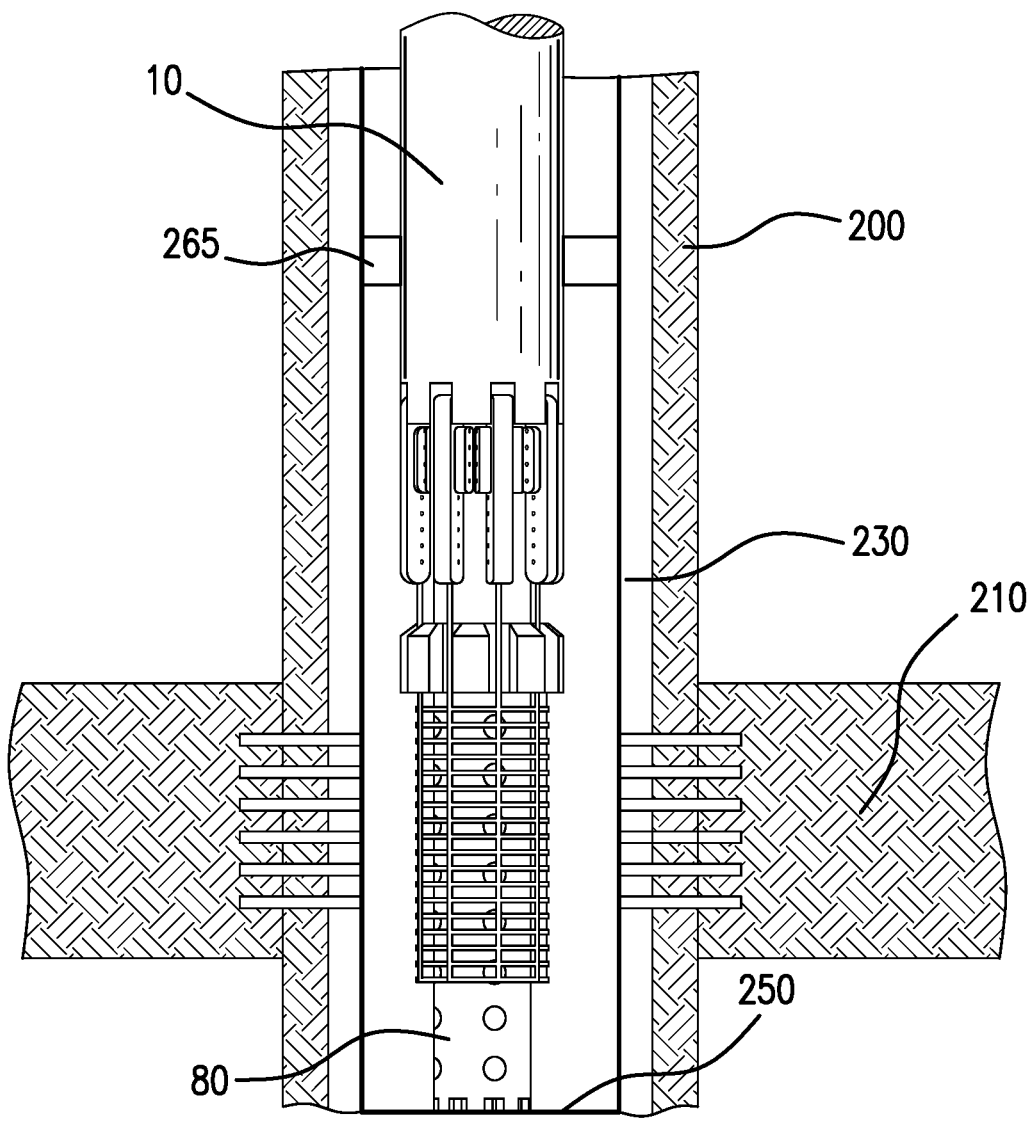
FIG. 5 shows a fines control assembly positioned in a wellbore near a production zone.
Figure 6A:
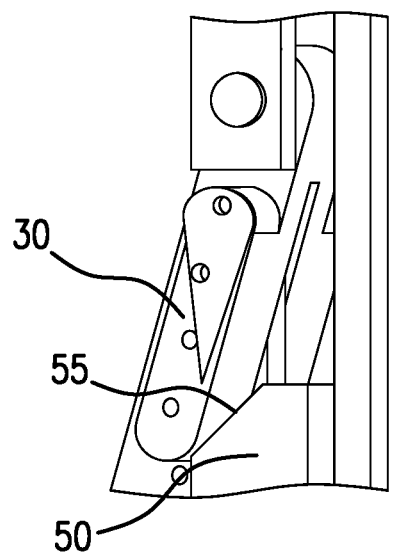
FIG. 6A and FIG. 6B illustrate the movement of a controller relative to arms in a deployment mechanism during the deployment of a screen mesh.
Figure 6B:
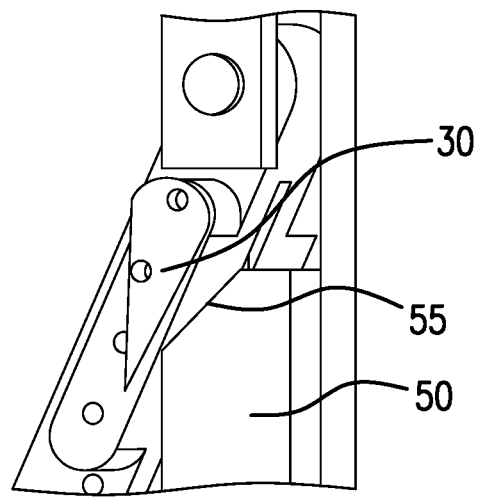

The assembly can be used to control fines migration in a wellbore. In use, the assembly 100 can be conveyed into a wellbore via a cable, tubing, and the like. Referring to FIGS. 5 and 6, the assembly 100 is introduced into a wellbore 200 near a production zone 210. A packer 265 can be used to provide a seal between the outside of the second tubular member 10 and the inside of the casing, liner, or wellbore wall 230 to ensure that oils can flow to the surface via first tubular member 80 and second tubular member 10 rather than via the open space between the first tubular member 10 and wall 230. Once the assembly has been positioned at the desired location, the screen mesh deployment mechanism is activated. For example, when the first tubular member 80 is stopped at the bottom of the wellbore 250, the second tubular member 10 continues its downward movement. The arm 30 on the second tubular member 10 thus moves towards the controller 50 mounted on the first tubular member 80. The relative movement allows the tapered surface 55 of the controller 50 to engage arm 30, thereby causing the arm 30 to pivot and extend outwardly from the second tubular member 80.

Figure 7:
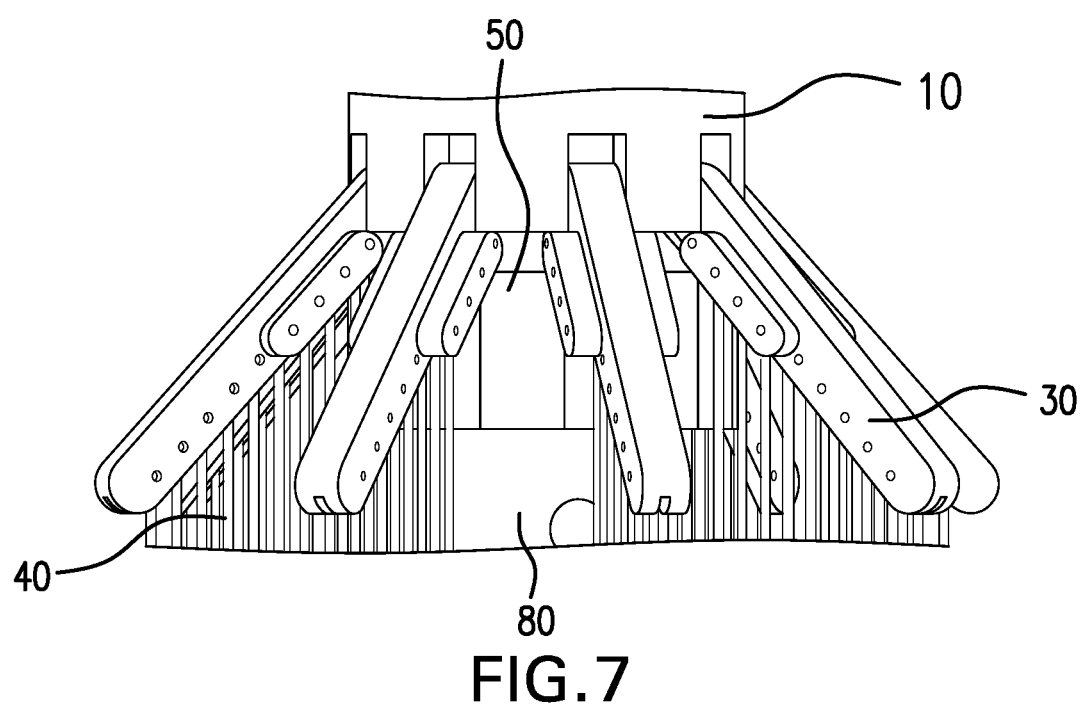
FIG. 7 illustrates partially extended arms during the deployment of a screen mesh.
Figure 8:
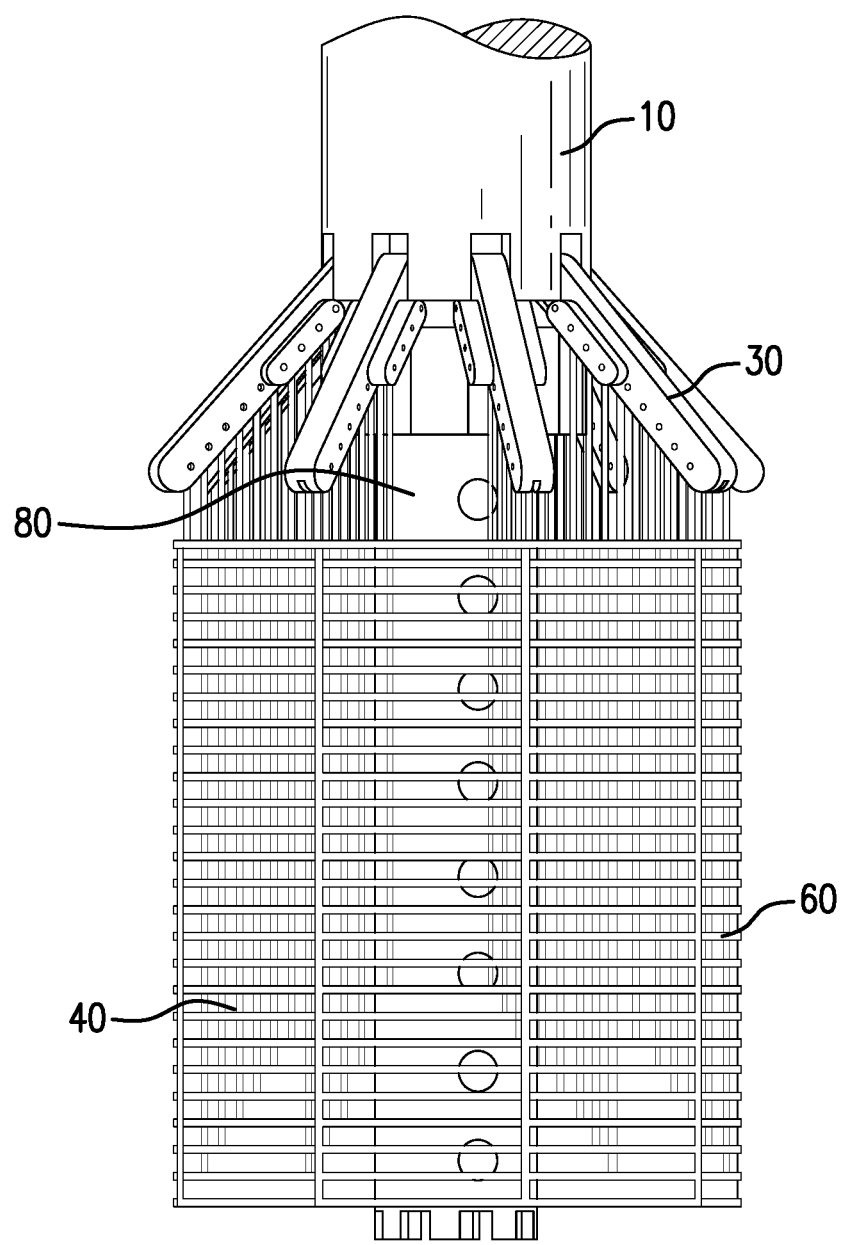
FIG. 8 illustrates a partially deployed screen mesh.
Figure 9:
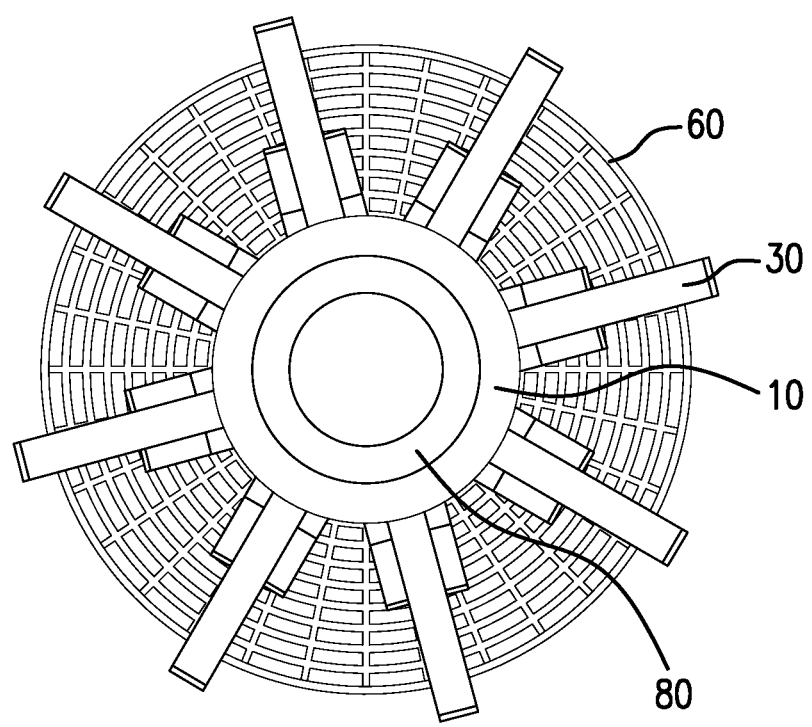
FIG. 9 is a top view of a fully deployed screen mesh.
Figure 10:
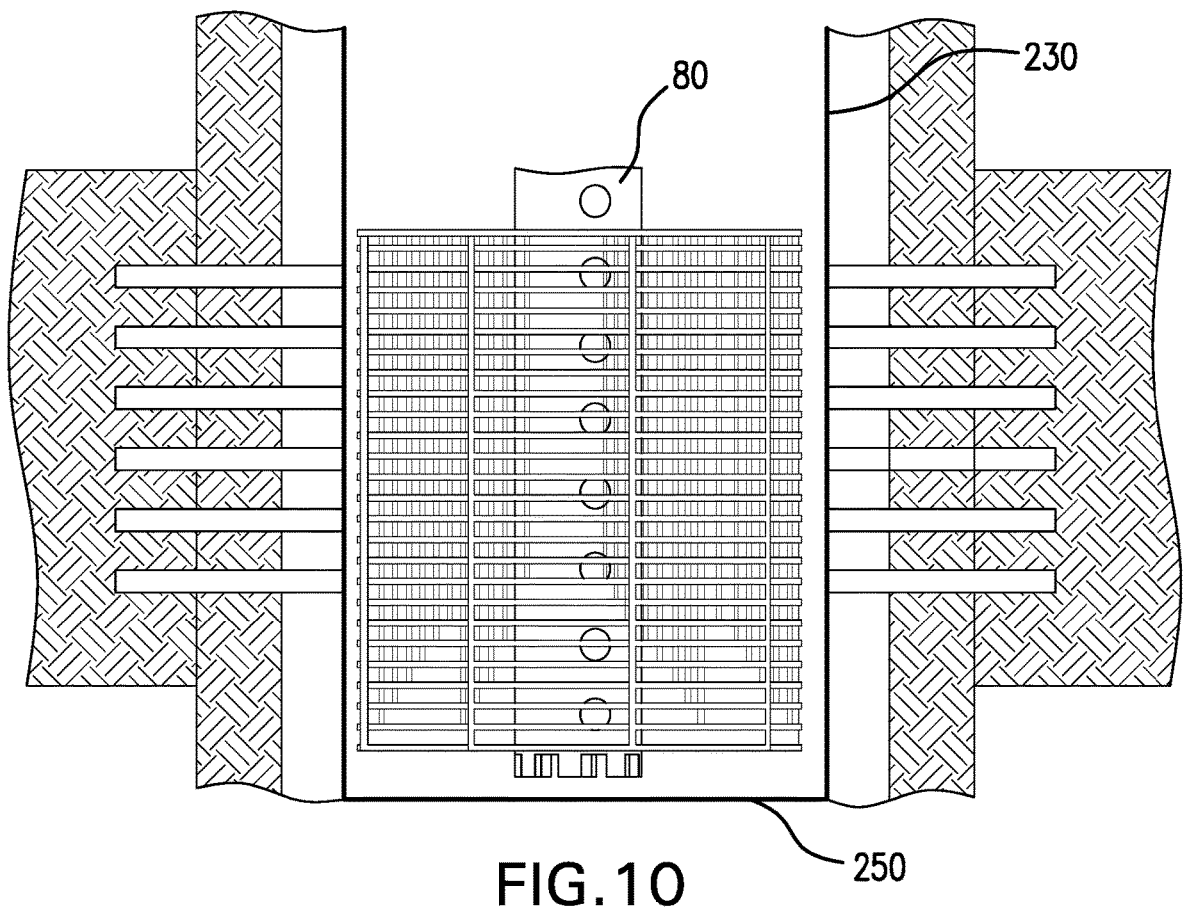
FIG. 10 illustrates a fully deployed screen mesh in a wellbore near a production zone.

Referring to FIGS. 7 and 8, when the arm 30 is extended, the ribs 40 attached to arm 30 move and deploy the screen mesh 60. FIG. 9 is a top cross-sectional view of a fully deployed screen mesh. FIG. 10 illustrates a fully deployed screen mesh in a wellbore near a production zone. A fully deployed screen mesh can fill the annulus between the first tubular member 80 and a wall of the wellbore or a wall of the casing 230.

Figure 11:
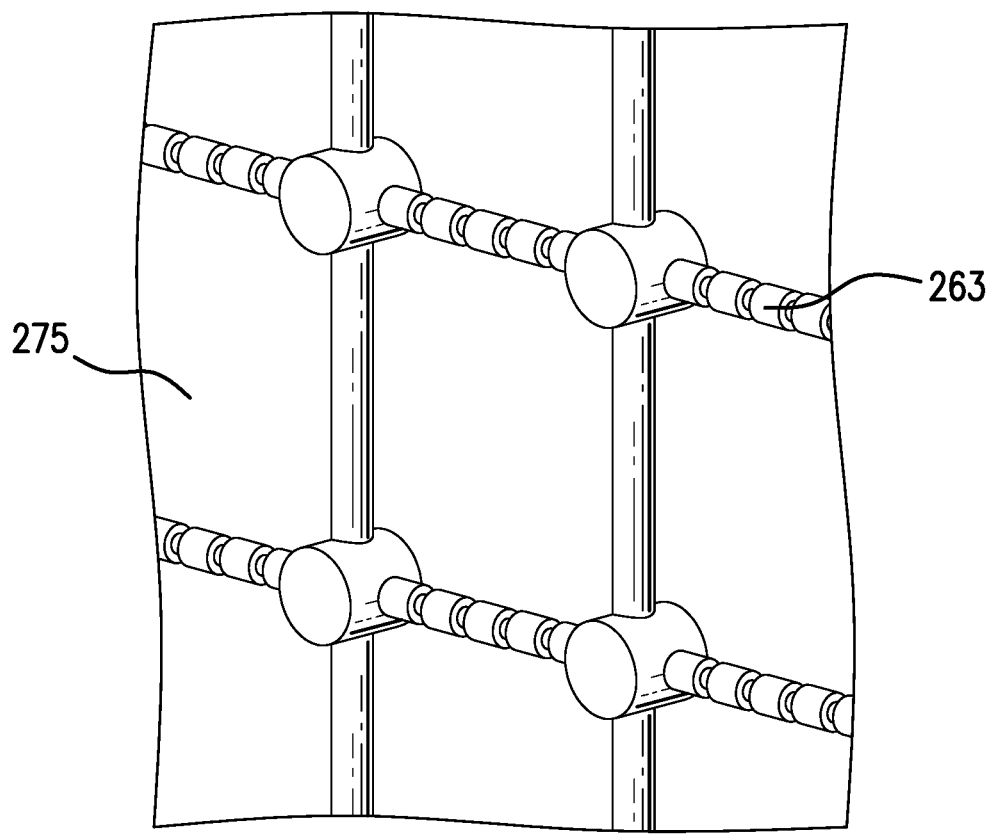
FIG. 11 illustrates the set cement and channels that can be used to control formation fines migration.

A cement slurry is then injected into the first tubular member 10, and flow out of the first tubular member 80 via apertures 70 to fill the open spaces within the screen mesh 60. Referring to FIG. 11, the cement slurry is then allowed to set forming a set cement 275 that reduces or substantially preventing the passage of formation particles from the subterranean formation into the wellbore.

Before the cement is set or during setting, the degradable material in the screen meshes can be removed forming a fluid pathway 263, which allows passage of formation fluids from the subterranean formation into the wellbore. The degradable material can be removed by injecting a fluid to corrode the degradable material. Alternatively, the cement slurry comprises a chemical that is effective to corrode the degradable material. Thus the fluid pathway 263 and the set cement 275 can be formed around the same time frame.

The set cement in the first tubular member 10 can be removed by mechanical means. For example the set cement in the first tubular member can be drilled and broken down into small pieces, then the small pieces can be flushed out of the wellbore.

The assembly can have two sets of apertures 70. One set of the apertures are open when the screen mesh is in the unexpanded form, and the other set of the apertures are filled with a degradable material when the screen mesh is in the unexpanded form. The first set of apertures allow the cement to flow out of the first tubular member 80 and fill the open spaces within the screen mesh 60. The second set of apertures can be opened by corroding the degradable material away thus allowing the oils in the subterranean formation to flow via the second set of apertures into the first tubular member 80, then the second tubular member 10, and eventually to the surface of the wellbore.

The particles or fines in the formation that can be screened out of the wellbore include proppant particles introduced into the formation or derivatives thereof such as crushed proppant particles, particles generated from the formation, or a combination comprising at least one of the foregoing. Particles generated from the formation are not particularly limited. For example, particles may result from an unconsolidated or inherently unstable formation, or from the use of an incompatible treatment fluid that liberates fine particles. Exemplary particles in the formation comprise sand, gravel, crushed stone, slag, recycled concrete, silica, grass spheres, limestone, feldspar, ceramics, or a combination comprising at least one of the foregoing.

Examples of the materials that can be used in the methods and assemblies are described below. The degradable material comprises a polymeric material, a metallic material, dissolvable glass, or a combination comprising at least one of the foregoing.

In an embodiment, the degradable material comprises pure Mg metal, pure Al metal, pure Zn metal, pure Mn metal, a Mg based alloy, an aluminum based alloy, a zinc based alloy, a Mn based alloy, a composite thereof, or a combination comprising at least one of the foregoing. The degradable material can further comprise Ni, W, Mo, Cu, Fe, Cr, Co, an alloy thereof, or a combination comprising at least one of the foregoing.

An example of the degradable material is a composite having a substantially-continuous, cellular nanomatrix comprising a nanomatrix material; a plurality of dispersed particles comprising a particle core material that comprises pure Mg metal, pure Al metal, pure Zn metal, pure Mn metal, a Mg based alloy, an aluminum based alloy, a zinc based alloy, a Mn based alloy, or a combination thereof, dispersed in the cellular nanomatrix; and a solid-state bond layer extending throughout the cellular nanomatrix between the dispersed particles. The matrix comprises deformed powder particles formed by compacting powder particles comprising a particle core and at least one coating layer, the coating layers joined by solid-state bonding to form the substantially-continuous, cellular nanomatrix and leave the particle cores as the dispersed particles. The dispersed particles have an average particle size of about 5 µm to about 300 µm. The nanomatrix material comprises Al, Zn, Mn, Mg, Mo, W, Cu, Fe, Si, Ca, Co, Ta, Re or Ni, or an oxide, carbide or nitride thereof, or a combination of any of the aforementioned materials. The chemical composition of the nanomatrix material is different than the chemical composition of the nanomatrix material. The composite can be formed from coated particles and is referred to herein as controlled electrolytic materials (CEM). The CEM materials have been described in U.S. Pat. Nos. 8,528,633 and 9,101,978.

Examples of degradable polymeric materials include a poly(lactic acid), a polyethylene glycol, a polypropylene glycol, a polyglycolic acid, a polycaprolactone, a polylactide-co-glycolide, a polydioxanone, a polyhydroxyalkanoate, a polyhydroxybutyrate, a polyurethane such as polyurethane having ester or ether linkages, a polyvinyl acetate, a polyester, copolymer thereof, or a combination comprising at least one of the foregoing.

Dissolvable glass such as dissolvable silicates are generally not distinct stoichiometric chemical substances. The dissolvable silicate can comprise about 55 to about 80 wt. % of $SiO_2$, 0 to about 35 wt. % of $Na_2O$, 0 to about 35 wt. % of $K_2O$, 0 to about 20 wt. % of CaO, and 0 to about 10 wt. % of MgO, provided that the sum of the weights of $Na_2O$ and $K_2O$ is about 20 wt. % to about 40 wt. %, about 20 wt. % to about 35 wt. %, or about 22 wt. % to about 33 wt. %, wherein each weight percent is based on the total weight of the dissolvable silicates. The general formula for dissolvable alkali silicates is $M_2OxSiO_2$, where M is Na, K, or Li, and x is the molar ratio defining the number of moles silica ($SiO_2$) per mole of alkali metal oxide ($M_2O$). In an embodiment, the dissolvable silicates comprise at least one of sodium silicate or potassium silicate. Preferably the dissolvable silicates comprise sodium silicate having a formula of $Na_2O.SiO_2$, wherein the weight percent of $SiO_2$ relative to $Na_2O$ is about 3.22:1 to about 1:1, about 3.22:1 to about 2.5:1, specifically about 2:1 to about 1:1.

The cement slurry can include any cementitious material that sets and hardens by reaction with water, and is suitable for forming a set cement downhole, including mortars and concretes. Suitable hydraulic cements, including mortars and concretes, include those typically employed in a wellbore environment, for example those comprising calcium, aluminum, silicon, oxygen, or sulfur. Such hydraulic cements include, but are not limited to, Portland cements, pozzolana cements, gypsum cements, high alumina content cements, silica cements, and high alkalinity cements. Portland cements are particularly useful. In some embodiments, the Portland cements that are suited for use are classified as Class A, B, C, G, and H cements according to American Petroleum Institute, API Specification for Materials and Testing for Well Cements. The cements as used herein encompass various concretes by the further addition of aggregates, such as a coarse aggregate made of gravel or crushed rocks such as chert, quartzite, granite, or a fine aggregate such as sand or crushed sand.

The cement slurry can further comprise other components known for use in cementing, for example an accelerator to reduce setting time, a setting retardant to extend setting time, a fluid loss control agent, an extender to lower density, a foaming agent to reduce density, a weighting agent to increase density, a dispersant to reduce viscosity, other fluid loss control agents, thixotropic agents, a bridging agent (e.g., gilsonite or cellophane flakes), or a combination comprising at least one of the foregoing.

Depending on the specific degradable material used, the fluid or the chemical in the cement that is effective to corrode the degradable material in the screen mesh includes brines, acids, bases, or compatible combinations thereof. The acids can include hydrochloric acid, citric acid; succinic acid; 2-acrylamide-2-methylpropane sulfonic acid; lignosulfonic acid; sulfamic acid; or adipic acid. The bases can include calcium oxide; calcium hydroxide; aluminum hydroxide; or aluminum oxide. The brines can include potassium chloride, calcium chloride, calcium bromide or zinc bromide. Combinations of these materials can be used.

Set forth below are various embodiments of the disclosure.

Embodiment 1

A method of controlling fines migration in a wellbore penetrating a subterranean formation, the method comprising: introducing into the wellbore a screen mesh in an unexpanded form disposed of a first tubular member having a body with apertures, the screen mesh comprising a degradable material; expanding the screen mesh; injecting a cement slurry into the wellbore to fill open spaces within the expanded screen mesh; allowing the cement slurry to set forming a set cement that reduces or substantially preventing the passage of formation particles from migrating from the subterranean formation into the wellbore; and removing the degradable material of the screen mesh forming a fluid pathway in the set cement, which allows a formation fluid to flow from the subterranean formation into the wellbore.

Embodiment 2

The method as in any prior embodiment, wherein the first tubular member is coupled to a second tubular member in such a way that allows for a relative longitudinal motion between the first tubular member and the second tubular member.

Embodiment 3

The method as in any prior embodiment, wherein expanding the screen mesh comprises activating a deployment mechanism comprising a controller mounted on the first tubular member and at least an arm secured to the second tubular member via a pivoting point, the arm having a plurality of ribs connected to the screen mesh.

Embodiment 4

The method as in any prior embodiment, wherein activating the deployment mechanism comprises allowing the first tubular member to move longitudinally relative to the second tubular member; engaging the controller with the arm to cause the arm to pivot and extend outwardly from the second tubular member; and expanding the screen mesh with the plurality of the ribs on the arm when the arm is extended.

Embodiment 5

The method as in any prior embodiment, wherein the screen mesh comprises metal wires coated with the degradable material.

Embodiment 6

The method of as in any prior embodiment, wherein the screen mesh comprises wires that are formed of the degradable material.

Embodiment 7

The method as in any prior embodiment, further comprising injecting a fluid into the wellbore to corrode the degradable material in the screen mesh.

Embodiment 8

The method as in any prior embodiment, wherein the fluid is injected after the cement slurry is set.

Embodiment 9

The method as in any prior embodiment, wherein the fluid is injected before the cement slurry is set.

Embodiment 10

The method as in any prior embodiment, wherein the cement slurry comprises a chemical that corrodes the degradable material.

Embodiment 11

The method as in any prior embodiment, wherein the degradable material comprises a polymeric material, a metallic material, dissolvable glass, or a combination comprising at least one of the foregoing.

Embodiment 12

The method as in any prior embodiment, wherein the degradable material comprises Zn, Mg, Al, Mn, an alloy thereof, a composite thereof, or a combination comprising at least one of the foregoing.

Embodiment 13

The method as in any prior embodiment, wherein the degradable material is a polymeric material comprising a poly(lactic acid), a polyethylene glycol, a polypropylene glycol, a polyglycolic acid, a polycaprolactone, a polylactide-co-glycolide, a polydioxanone, a polyhydroxyalkanoate, a polyhydroxybutyrate, a polyurethane such as polyurethane having ester or ether linkages, a polyvinyl acetate, a polyester, copolymer thereof, or a combination comprising at least one of the foregoing.

Embodiment 14

An assembly for controlling fines migration in a wellbore penetrating a subterranean formation, the system comprising: a first tubular member having a body with apertures; a screen mesh disposed of the first tubular member, the screen mesh comprising a degradable material; a second tubular member coupled to the first tubular member in such a way that allows for a relative longitudinal motion between the first tubular member and the second tubular member; and a deployment mechanism configured to expand the screen mesh once the screen mesh is placed in the wellbore next to a zone of interest.

Embodiment 15

The assembly as in any prior embodiment, wherein the deployment mechanism comprises: a controller mounted on the first tubular member; and at least an arm secured to the second tubular member via a pivoting point, the arm having a plurality of ribs connected to the screen mesh.

Embodiment 16

The assembly as in any prior embodiment, wherein the controller has a tapered surface configured to engage the arm to cause the arm to pivot and extend outwardly from the second tubular member during deployment.

Embodiment 17

The assembly as in any prior embodiment, wherein the screen mesh comprises metal wires coated with a degradable material.

Embodiment 18

The assembly as in any prior embodiment, wherein the screen mesh comprises wires that are formed of a degradable material.

Embodiment 19

The assembly as in any prior embodiment, wherein the degradable material comprises a polymeric material, a metallic material, dissolvable glass, or a combination comprising at least one of the foregoing.

All ranges disclosed herein are inclusive of the endpoints, and the endpoints are independently combinable with each other. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. The modifier "about" used in connection with a quantity is inclusive of the stated value and has the meaning dictated by the context (e.g., it includes the degree of error associated with measurement of the particular quantity). In an embodiment, the term "about" means that the value associated with about can vary by 10%. As used herein, size means largest dimension. Unless defined otherwise, technical and scientific terms used herein have the same meaning as is commonly understood by one of skill in the art to which this invention belongs.

All references cited herein are incorporated by reference in their entirety. While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A method of controlling fines migration in a wellbore penetrating a subterranean formation, the method comprising:
    introducing into the wellbore a screen mesh in an unexpanded form disposed of a first tubular member having a body with apertures, the screen mesh comprising a degradable material;
    expanding the screen mesh;
    injecting a cement slurry into the wellbore to fill open spaces within the expanded screen mesh;
    allowing the cement slurry to set forming a set cement that reduces or substantially preventing the passage of formation particles from migrating from the subterranean formation into the wellbore; and
    removing the degradable material of the screen mesh forming a fluid pathway in the set cement, which allows a formation fluid to flow from the subterranean formation into the wellbore,
    wherein the cement slurry comprises a chemical that corrodes the degradable material.

2. The method of claim 1, further comprising injecting a fluid into the wellbore to corrode the degradable material in the screen mesh.

3. The method of claim 2, wherein the fluid is injected after the cement slurry is set.

4. The method of claim 2, wherein the fluid is injected before the cement slurry is set.

5. The method of claim 1, wherein the degradable material comprises a polymeric material, a metallic material, dissolvable glass, or a combination comprising at least one of the foregoing.

6. The method of claim 1, wherein the degradable material comprises Zn, Mg, Al, Mn, an alloy thereof, a composite thereof, or a combination comprising at least one of the foregoing.

7. The method of claim 1, wherein the degradable material is a polymeric material comprising a poly(lactic acid), a polyethylene glycol, a polypropylene glycol, a polyglycolic acid, a polycaprolactone, a polylactide-co-glycolide, a polydioxanone, a polyhydroxyalkanoate, a polyhydroxybutyrate, a polyurethane such as polyurethane having ester or ether linkages, a polyvinyl acetate, a polyester, copolymer thereof, or a combination comprising at least one of the foregoing.

8. A method of controlling fines migration in a wellbore penetrating a subterranean formation, the method comprising:
introducing into the wellbore a screen mesh in an unexpanded form disposed of a first tubular member having a body with apertures, the screen mesh comprising a degradable material;
expanding the screen mesh;
injecting a cement slurry into the wellbore to fill open spaces within the expanded screen mesh;
allowing the cement slurry to set forming a set cement that reduces or substantially preventing the passage of formation particles from migrating from the subterranean formation into the wellbore; and
removing the degradable material of the screen mesh forming a fluid pathway in the set cement, which allows a formation fluid to flow from the subterranean formation into the wellbore,
wherein the first tubular member is coupled to a second tubular member in such a way that allows for a relative longitudinal motion between the first tubular member and the second tubular member.

9. The method of claim 8, wherein expanding the screen mesh comprises activating a deployment mechanism comprising a controller mounted on the first tubular member and at least an arm secured to the second tubular member via a pivoting point, the arm having a plurality of ribs connected to the screen mesh.

10. The method of claim 9, wherein activating the deployment mechanism comprises allowing the first tubular member to move longitudinally relative to the second tubular member; engaging the controller with the arm to cause the arm to pivot and extend outwardly from the second tubular member; and expanding the screen mesh with the plurality of the ribs on the arm when the arm is extended.

11. The method of claim 8, wherein the cement slurry comprises a chemical that corrodes the degradable material.

12. A method of controlling fines migration in a wellbore penetrating a subterranean formation, the method comprising:
introducing into the wellbore a screen mesh in an unexpanded form disposed of a first tubular member having a body with apertures, the screen mesh comprising a degradable material;
expanding the screen mesh;
injecting a cement slurry into the wellbore to fill open spaces within the expanded screen mesh;
allowing the cement slurry to set forming a set cement that reduces or substantially preventing the passage of formation particles from migrating from the subterranean formation into the wellbore; and
removing the degradable material of the screen mesh forming a fluid pathway in the set cement, which allows a formation fluid to flow from the subterranean formation into the wellbore,
wherein the screen mesh comprises metal wires coated with the degradable material.

13. A method of controlling fines migration in a wellbore penetrating a subterranean formation, the method comprising:
introducing into the wellbore a screen mesh in an unexpanded form disposed of a first tubular member having a body with apertures, the screen mesh comprising a degradable material;
expanding the screen mesh;
injecting a cement slurry into the wellbore to fill open spaces within the expanded screen mesh;
allowing the cement slurry to set forming a set cement that reduces or substantially preventing the passage of formation particles from migrating from the subterranean formation into the wellbore; and
removing the degradable material of the screen mesh forming a fluid pathway in the set cement, which allows a formation fluid to flow from the subterranean formation into the wellbore,
wherein the screen mesh comprises wires that are formed of the degradable material.

14. An assembly for controlling fines migration in a wellbore penetrating a subterranean formation, the system comprising:
a first tubular member having a body with apertures;
a screen mesh disposed of the first tubular member, the screen mesh comprising a degradable material;
a second tubular member coupled to the first tubular member in such a way that allows for a relative longitudinal motion between the first tubular member and the second tubular member; and
a deployment mechanism configured to expand the screen mesh once the screen mesh is placed in the wellbore next to a zone of interest,
wherein the deployment mechanism comprises:
a controller mounted on the first tubular member; and
at least an arm secured to the second tubular member via a pivoting point, the arm having a plurality of ribs connected to the screen mesh.

15. The assembly of claim 14, wherein the controller has a tapered surface configured to engage the arm to cause the arm to pivot and extend outwardly from the second tubular member during deployment.

16. The assembly of claim 14, wherein the screen mesh comprises metal wires coated with a degradable material.

17. The assembly of claim 14, wherein the degradable material comprises a polymeric material, a metallic material, dissolvable glass, or a combination comprising at least one of the foregoing.

18. An assembly for controlling fines migration in a wellbore penetrating a subterranean formation, the system comprising:
a first tubular member having a body with apertures;
a screen mesh disposed of the first tubular member, the screen mesh comprising a degradable material;
a second tubular member coupled to the first tubular member in such a way that allows for a relative longitudinal motion between the first tubular member and the second tubular member; and
a deployment mechanism configured to expand the screen mesh once the screen mesh is placed in the wellbore next to a zone of interest, wherein the screen mesh comprises wires that are formed of a degradable material.

* * * * *